Figure 1:
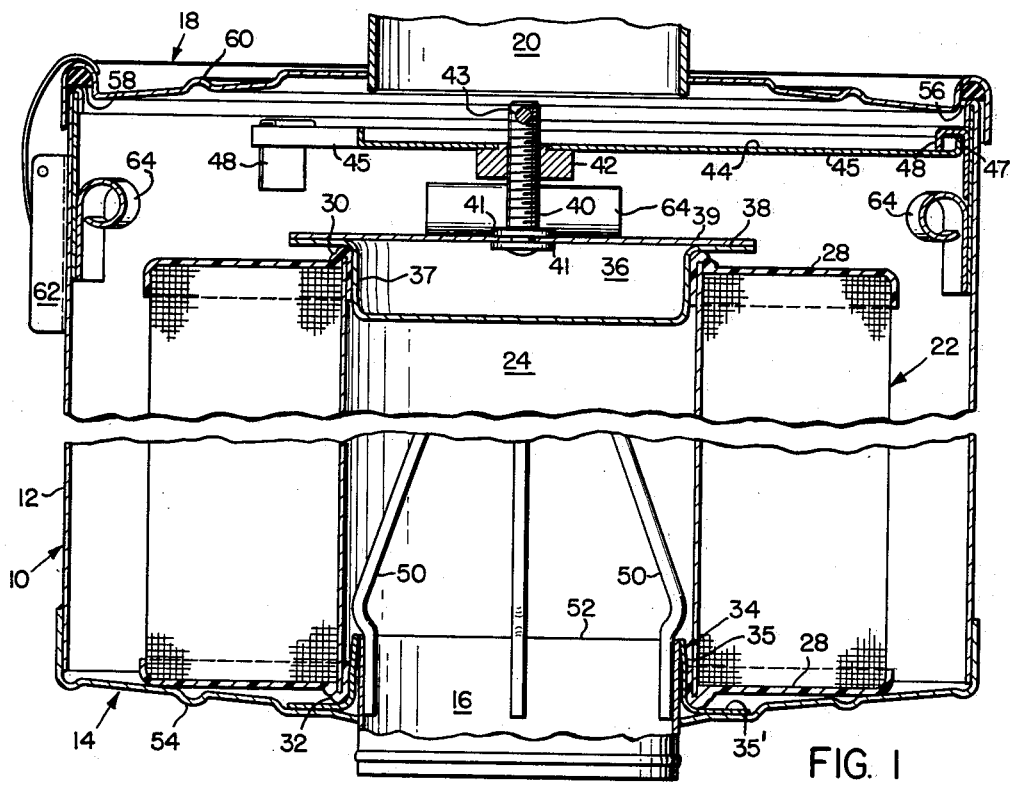

Dec. 8, 1964

P. F. WILBER 3,160,488

FILTER

Filed Jan. 26, 1962

INVENTOR.
PAUL F. WILBER
BY
Attorney

3,160,488
FILTER
Paul F. Wilber, Richland, N.Y., assignor to Dollinger Corporation, Rochester, N.Y., a corporation of New York
Filed Jan. 26, 1962, Ser. No. 168,998
8 Claims. (Cl. 55—501)

This invention relates to an air filter or the like, of the type having a replaceable cartridge type filter element.

One object of this invention is to provide a filter having a removable, replaceable filter cartridge, in which means is provided for applying pressure to effectively seal the cartridge in its housing and so that fluid cannot leak around the ends of the cartridge, but must pass radially through it as the fluid flows through the housing.

Another object of the invention is to provide a novel cartridge type filter, which includes a relatively simple arrangement for retaining a filter cartridge in a housing against vibration and at the same time effectively sealing the cartridge in the housing.

Another object of the invention is to provide means in a filter of this type, which is adjustable to compensate for reasonable dimensional variations between successive cartridges, thereby permitting easily attainable manufacturing tolerances in the production of the cartridges and also in the manufacture of their housings.

Still another object of the invention is to provide a novel filter of this type, which is of relatively simple and inexpensive construction, yet easy to load and to unload, and which is reliable, efficient, and rugged and long lasting in service.

Figure 2:
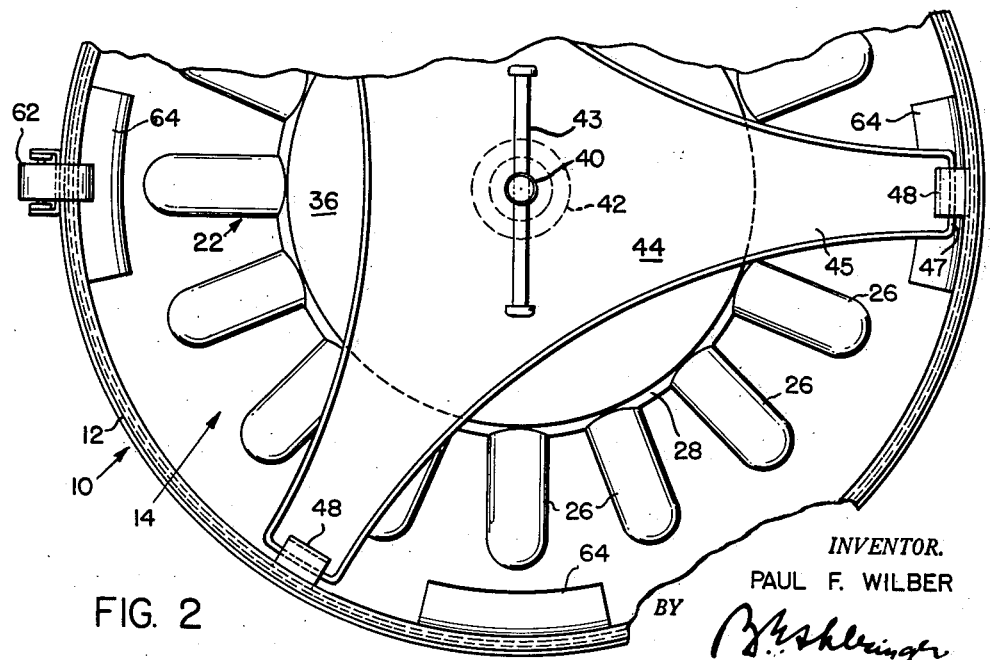

The foregoing and other objects of the invention will become apparent from the following detailed description of a representative embodiment thereof, and from the claims, particularly when taken together with the drawing, wherein:

FIG. 1 is an axial sectional view of a filter built according to a presently preferred embodiment of the invention; and FIG. 2 is a plan view of this filter, with its cover removed.

The embodiment of the invention described herein includes a filter cartridge of the general type described and claimed in my U.S. Patent No. 2,962,121, issued November 29, 1960. The invention is not so limited, however, but is readily adaptable for use in filters that include cartridges of other types than the one specifically disclosed herein.

Referring now to the drawing by numerals of reference, the filter shown therein includes a housing 10 of generally cylindrical construction. The cylindrical side wall 12 of this housing is closed at one end by an end wall 14, which is permanently sealed and secured, as by welding, brazing, soldering, or the like, around its outer edge, to the side wall 12. An outlet nipple 16 is sealed centrally through the end wall 14 for connecting the outlet end of the filter to the system (not shown), such as the air inlet of the carburetor of an internal combustion engine, with which the filter is to be used. The opposite, or inlet end of the housing 10 is fitted with a removable cover 18, through which the inlet nipple 20 is sealed. The nipple 20 may open directly to the atmosphere, or may be connected to an elongate inlet conduit, as would be the case, for example, where the filter is used on a submersible vehicle such as those designed to ford streams.

The illustrated cartridge 22 is of the type described in the hereinabove identified patent, and is removably retained and sealed within the housing 10 in such a way that all air entering into the housing through the inlet nipple 20 must pass through and be filtered by the cartridge 22 before leaving the housing through the outlet nipple 16.

The cartridge 22 is of the radial fin type comprising a foraminous, cylindrical core 24 made of screening, expanded metal, or the like, a filter element folded to form a plurality of radially projecting, axially-extending fins, or pleats 26, fitted around the core 24, and a pair of elastomeric end caps 28 made of a yieldable plastic, in which the ends of the fins 26 and the ends of the core 24 are embedded. The core 24 of the cartridge is slightly longer than the fins 26, and projects beyond the fins 26 at both ends of the cartridge. End caps 28 cover the ends of the core and of the fins, and extend a relatively short distance axially inwardly along the inside of the core 24.

The end caps have annular axially-projecting ribs 30 and 32 which constitute gaskets for sealing the filter cartridge to the housing 10. At the outlet end, the cartridge 22 seats around the against an annulus 34 of L-shaped section, whose axially-extending portion 35 is welded or brazed to outlet nipple 16 and whose radially-extending flange 35' is welded or brazed to the end wall 14 of the housing. The axially extending flange 35 of this annulus is tapered toward its open end to facilitate its entry into the core 24, and to provide radial sealing pressure against the lower end cap 28, when the cartridge is pushed home to its fully seated position on the radial flange 35' of this annulus. The opposite end of the core 24 is closed by a plug 36, which includes a cup-shape portion 37 and an end disc 39. The cup-shaped portion 37 is dimensioned to fit within the upper end cap 28 and to seal against the inside wall thereof. The cup-shaped portion has an annular, radially outwardly extending flange 38 for sealing engagement against the top of the annular ridge 30 of this upper end cap.

The plug 36 is loosely retained at the lower end of a screw 40 upon an unthreaded portion thereof (not separately designated) by spaced washers 41. The screw 40 is threaded through a nut 42, which is welded, or otherwise secured, to the lower face of a spider 44. A pin 43, which passes diametrally through the screw 40 above the spider 44, is provided for manually turning the screw 40 in a desired direction.

In the embodiment shown, the spider has three radially-extending equispaced arms 45 whose outer ends 47 are upturned. Inwardly projecting, angularly-spaced, sheet metal hooks 48 are welded or otherwise secured to the inner side of the cylindrical side wall 12 of the housing to engage the respective legs of the spider 44 thereby to retain it in the casing, when the spider is adjusted into the angular position shown.

When assembling the filter, the cartridge 22 is placed in the housing 10 and pushed firmly down upon the L-sectioned annulus 34 at the outlet end. Angularly spaced spring wire guides 50 are secured within the outlet nipple 16 and extend centrally into the housing 10 to guide the cartridge 22 into proper position in the housing. The guides 50 are arranged in a generally conical pattern to enter the core 24, and serve to guide the cartridge into position and to keep it from contacting and rubbing against the inner edge 52 of the outlet nipple 16.

The plug 36 is then inserted in the upper end of the core 24 and the spider 44 is rotated to engage the ends 47 of its arms 45 beneath the sheet metal hooks 48 to lock the plug to the housing 10. The pin 43 is then turned to cause the screw 40 to move the plug away from the spider 44 to seat the plug 36 fully in the inlet end of the cartridge 22, to seat the cartridge 22 fully upon the annulus 34, and to lock the hooked ends 47 of the spider securely in engagement with the hooks 48. This not only seals the end caps of the cartridge against the cup-shaped portion 37 of the plug and the axial flange 35 of the annulus, but also brings the ribs 30 and 32 of the end caps into axial, or endwise, sealing engagement with the radial flange 38 of the plug and with the radial flange 35' of the annulus.

The end wall 14 of the housing is annularly grooved as at 54 to facilitate flexing of the end wall and to provide resilience therein to maintain a resilient biasing force through the spider 44, the screw 40, and the plug 36 upon the cartridge 22 to keep the cartridge 22 properly seated in the housing 10 and to maintain sealing pressure on the cartridge 22.

The outer cover 18 for the filter is formed with a peripheral groove 56 for receiving the upper end of the cylindrical wall 12. A gasket 58, which may be of rubber, or of plastic molded in situ, is seated within the groove 56 to provide a seal between the cover 18 and the cylindrical wall 12 of the housing when the cover 18 is in place thereon. The cover 18 is latched in place by a plurality of conventional toggle type clamps designated as a whole at 62, or by any other desired latching means, which may be angularly spaced around the housing as desired, and which are secured as by welding, brazing, riveting, or soldering, to the outer wall 12 adjacent to the inlet end of the filter.

The cover 18 includes an annular groove 60 to allow for flexing to take up vibration or shock. The grooves 54 and 60 permit the end plate 14 and the cover 18 to act in the manner of a bellows to accommodate lengthening and shortening of the spacing between the inlet and outlet nipples 16 and 20 without disturbing the seals between the cartridge and the housing, or the seal around the outer edge of the cover 18.

Equiangularly-spaced, arcuate tubular bumpers, or guides 64 having smooth inwardly facing surfaces are fixed within the housing 10 adjacent to the inlet end thereof to protect the cartridge 22 from contact with the sheet metal hooks 48 and from being torn or damaged when it is being removed from the housing as for cleaning or replacement. The bumpers 64 project radially inwardly beyond the inner edges of the retaining hooks 48, and also serve as guides to insure proper alignment of the cartridge 22 in the casing 10 during loading.

The filter of the present invention is relatively simple and inexpensive, yet highly efficient and reliable in operation. It is easy to load and to unload cartridges, and the provision of an inner cartridge cover with its adjustment permits accommodating dimensional variations from cartridge to cartridge within a practical tolerance range, while at the same time insuring that the cartridge is fully sealed in the housing, and watertight. Thus, the filter of this invention is suitable for underwater, as well as for more conventional applications.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A filter comprising
(a) a replaceable cartridge of the type having a cylindrical, foraminous core and filtering means extending radially outwardly from and surrounding said core, said cartridge having continuous annular sealing surfaces at both of its ends,
(b) a generally cylindrical housing enclosing said cartridge,
(c) an end plate closing one end of said housing,
(d) an outlet nipple sealed through said end plate and extending into said housing coaxially therewith, said nipple being smaller than said core and extending partly into said core and the bore of one of said annular sealing surfaces,
(e) a plug in sealing engagement with the other of said annular sealing surfaces,
(f) a spider fitting within and spanning the said housing adjacent its opposite end,
(g) retainers fixed to said housing and extending radially inwardly from the cylindrical wall thereof and releasably engaged by said spider,
(h) an adjustment means connected to and between said spider and said plug for driving said plug away from said spider thereby to urge said plug into said core when said spider is positioned in engagement with said retainers,
(i) a cover for closing said opposite end of said housing, and
(j) means for retaining said cover in place upon said housing.

2. A filter comprising
(a) a replaceable cartridge of the type having a cylindrical, foraminous core and filtering means extending radially outwardly from and surrounding said cartridge, said core having continuous annular sealing surfaces at both ends, and
(b) a generally cylindrical housing enclosing said cartridge,
(c) an end plate closing one end of said housing,
(d) an outlet nipple sealed through said end plate and extending into said housing coaxially therewith, said nipple being smaller than said core and extending partly into said core and the bore of one of said annular sealing surfaces,
(e) an annulus of L-shaped section fitted in the annular corner between said nipple and said end wall and in sealing engagement with both said one annular sealing surface and said end wall,
(f) a plug in sealing engagement with the other of said annular sealing surfaces,
(g) a spider fitting within and spanning said housing adjacent the other end thereof,
(h) retainers fixed to said housing and extending radially inwardly from the cylindrical wall thereof and releasably engaged by said spider,
(i) an adjustment means connected to and between said spider and said plug for driving said plug away from said spider thereby to urge said plug into said core when said spider is positioned in engagement with said retainers,
(j) a cover for closing said other end of said housing, and
(k) means for retaining said cover in place upon said housing.

3. A filter comprising
(a) a replaceable cartridge of the type having a cylindrical, foraminous core and filtering means extending radially outwardly from and surrounding said core, said cartridge having continuous annular sealing surfaces at both of its ends, and
(b) a generally cylindrical housing enclosing said cartridge,
(c) an end plate closing one end of said housing,
(d) an outlet nipple sealed through said end plate and extending into said housing coaxially therewith, said nipple being smaller than said core and extending partly into said core and the bore of one of said annular sealing surfaces,
(e) a plug in sealing engagement with the other of said annular sealing surfaces,
(f) a spider fitting within and spanning said housing adjacent the other end thereof,
(g) retainers fixed to said housing and extending radially inwardly from the cylindrical wall thereof and releasably engaged by said spider,
(h) a nut secured to said spider centrally thereof,
(i) a screw threaded in said nut and rotatably mounted in said plug,
(j) means for turning said screw in one direction to urge said plug into said core and to secure said cartridge in said housing, when said member is positioned in engagement with said retainers,
(k) a cover for closing said other end of said housing, and
(l) releasable fasteners for securing said cover to said housing.

4. A filter comprising
(a) a replaceable cartridge of the type having a cylindrical, foraminous core and filtering means extending radially outwardly from and surrounding said core, said cartridge having continuous annular sealing surfaces at both of its ends, and
(b) a generally cylindrical housing enclosing said cartridge,
(c) an end plate closing one end of said housing,
(d) an outlet nipple sealed through said end plate and extending into said housing coaxially therewith, said nipple being smaller than said core and extending partly into said core and the bore of one of said annular sealing surfaces,
(e) a plug in sealing engagement with the other of said annular sealing surfaces,
(f) a spider shaped to fit within and to span said housing,
(g) retainers fixed to said housing and extending radially inwardly from the cylindrical wall thereof and releasably engaged by said spides,
(h) a nut secured on said spider centrally thereof,
(i) a screw threaded in said nut and rotatably mounted to said plug,
(j) means for turning said screw to urge said plug into said core and to secure said cartridge in said housing, when said member is positioned within the open end of said housing and in engagement with said retainers,
(k) a cover for closing said open end of said housing,
(l) releasable fasteners for said cover, and
(m) an outlet nipple sealed through said cover
(n) said end plate being annularly grooved so as to be flexible.

5. A filter comprising:
(a) a cylindrical housing portion,
(b) an end wall portion peripherally sealed to one end of said cylindrical portion and partially closing it,
(c) a nipple outlet sealed centrally through said end wall portion,
(d) a replaceable cartridge type filter element seated in said cylindrical housing portion,
(1) said filter element being in the form of an annulus having its central bore seated sealingly around said nipple,
(2) said filter element including resiliently compressible end caps at its opposite ends, one of which is in sealing engagement with said end wall portion and said nipple,
(e) a centering and retaining member removably seated in said central bore at the end thereof opposite from said end wall portion,
(1) said centering member having a body portion dimensioned to fit tightly in said opposite end of said bore, and
(2) a radially extending flange in sealing end-wise engagement with the portion of said filter element immediately surrounding said opposite end of said bore,
(f) a locking member spanning said cylindrical housing portion,
(g) catches projecting radially inwardly from said cylindrical housing portion and releasably engaged by said locking member to secured said locking member in said housing portion, and
(h) a pressure means connecting said locking member to said centering member and adjustable to push said centering member away from said locking member and against said filter element in the axial direction thereby to maintain said sealing engagements and to secure said filter element in said housing portion.

6. A filter comprising:
(a) a cylindrical housing portion,
(b) an end wall portion peripherally sealed to one end of said cylindrical portion and partially closing it,
(c) a nipple sealed centrally through said end wall portion,
(d) a replaceable cartridge type filter element seated in said cylindrical housing portion,
(1) said filter element being in the form of an annulus having its central bore seated sealingly around said nipple,
(2) said filter element including resiliently compressible end caps at its opposite ends, one of which is in sealing engagement with said end wall portion and said nipple,
(e) a centering and retaining member removably seated in said central bore at the end thereof opposite from said end wall portion,
(1) said centering member having a body portion dimensioned to fit tightly in said opposite end of said bore, and
(2) a radially extending flange in sealing end-wise engagement with the portion of said filter element immediately surrounding said opposite end of said bore,
(f) a locking member spanning said cylindrical housing portion,
(g) catches projecting radially inwardly from said cylindrical housing portion for engagement by said locking member to secure said locking member in said housing portion, and
(h) a screw drive means connected centrally between said locking member and said centering member for driving said centering member into pressure engagement with said filter element when said locking member is in engagement with said catches.

7. A filter comprising:
(a) a cylindrical housing portion,
(b) an end wall portion peripherally sealed to one end of said cylindrical portion and partially closing it,
(c) a nipple sealed centrally through said end wall portion,
(d) a replaceable cartridge type filter element seated in said cylindrical housing portion,
(1) said filter element being in the form of an annulus having its central bore seated sealingly around said nipple,
(2) said filter element including resiliently compressible end caps at its opposite ends, one of which is in sealing engagement with said end wall portion and said nipple,
(e) a centering and retaining member removably seated in said central bore at the end thereof opposite from said end wall portion,
(1) said centering member having a body portion dimensioned to fit tightly in said opposite end of said bore, and (2) a radially extending flange in sealing end-wise engagement with the portion of said filter element immediately surrounding said opposite end of said bore, (f) a locking member spanning said cylindrical housing portion, (g) catches projecting radially inwardly from said cylindrical housing portion for engagement by said locking member to secure said locking member in said housing portion, (h) a pressure means connecting said locking member to said centering member and adjustable to push said centering member away from said locking member and against said filter element in the axial direction to maintain said sealing engagements and to secure said filter element in said housing portion, (i) a cover removably seated upon the end of said cylindrical wall portion opposite that to which said end wall portion is sealed, and (j) means for securing said cover in sealing engagement with said opposite end of said cylindrical wall portion.

8. A filter as claimed in claim 7, wherein said cover has an opening therein constituting an outlet for said filter.

References Cited by the Examiner

UNITED STATES PATENTS

| | | | |
|---|---|---|---|
| 2,962,121 | 11/60 | Wilber | 210—493 X |
| 2,988,227 | 6/61 | Harms | 210—487 X |
| 3,012,631 | 12/61 | Kaser | 55—497 |
| 3,078,650 | 2/63 | Anderson et al. | 55—521 X |
| 3,083,832 | 4/63 | Hathoway et al. | 210—443 X |

FOREIGN PATENTS 1,115,158  12/55  France.

GEORGE D. MITCHELL, *Primary Examiner.*

HERBERT L. MARTIN, REUBEN FRIEDMAN, *Examiners.*